United States Patent [19]

Campbell et al.

[11] Patent Number: 5,675,416
[45] Date of Patent: Oct. 7, 1997

[54] APPARATUS AND METHOD FOR DETECTING AND SORTING PLASTIC ARTICLES HAVING A PREFERRED AXIS OF BIREFRINGENCE

[75] Inventors: Duncan B. Campbell; Carl D. Christy, both of Central Point; H. Parks Squyres, Medford; Steven D. Lancaster, Central Point, all of Oreg.

[73] Assignee: SRC Vision, Inc., Medford, Oreg.

[21] Appl. No.: 589,187

[22] Filed: Jan. 22, 1996

[51] Int. Cl.$^6$ .................. G01J 4/00; B07C 5/00; A01S 40/14
[52] U.S. Cl. .................. 356/367; 356/364; 356/428; 250/223 B; 250/225; 209/524; 209/577; 209/588; 382/142; 348/91
[58] Field of Search .................. 356/364–369, 356/370, 240, 428; 350/223 R, 225; 209/524, 576–577, 579, 588; 382/142–143; 348/91, 127

[56] References Cited

U.S. PATENT DOCUMENTS

| | | | |
|---|---|---|---|
| 4,919,534 | 4/1990 | Reed | 356/367 |
| 5,141,110 | 8/1992 | Trischan et al. | 209/524 |
| 5,260,576 | 11/1993 | Sommer, Jr. et al. | 356/432 |
| 5,314,072 | 5/1994 | Frankel et al. | 209/588 |
| 5,344,026 | 9/1994 | Booth et al. | 209/580 |
| 5,355,987 | 10/1994 | DeWoolfson et al. | 209/583 |
| 5,419,438 | 5/1995 | Squyres et al. | 209/587 |

*Primary Examiner*—Frank G. Font
*Assistant Examiner*—Jason D. Vierra Eisenberg
*Attorney, Agent, or Firm*—Stoel Rives LLP

[57] ABSTRACT

A sorting system (10) propels a stream of randomly arranged PET and PVC articles (12, 14) through an inspection zone (20) including a first light polarizer/analyzer combination (24, 26), an article-detecting gap (G), and a second light polarizer/analyzer combination (28, 30). The first and second polarizer/analyzer combinations are oriented to extinguish normally incident light in the absence of articles in the inspection zone and are offset 45 degrees relative to each other such that at least one polarizer/analyzer combination detects a principal axis of birefringence of PET articles. The gap is employed to detect the presence of an article in the inspection zone. A video camera (22) includes first, second, and third CCD arrays (58, 60, 62) positioned to receive respective light rays (48, 64, 50) from the first light polarizer/analyzer combination, the gap, and the second light polarizer/analyzer combination and to generate first, second, and third video signals representative of the light each receives. A video signal processor (68) processes the second video signal to identify the presence of multiple articles in the inspection zone, processes the first and third video signals to determine whether each of the multiple articles is made from PET, and selectively activates air ejectors (70) to separate the PET articles from the other articles.

43 Claims, 3 Drawing Sheets

APPARATUS AND METHOD FOR DETECTING AND SORTING PLASTIC ARTICLES HAVING A PREFERRED AXIS OF BIREFRINGENCE

TECHNICAL FIELD

This invention relates to sorting systems and, in particular, to an apparatus and a method for sorting post-consumer plastic articles including flakes of polyvinyl chloride and polyethylene terephthalate.

BACKGROUND OF THE INVENTION

Growing environmental awareness has developed a market for recycled plastic articles. Recycling of plastic articles is desirable because they are made from nonrenewable petrochemical resources, consume diminishing landfill space, and decompose very slowly. The market for recycled plastic is cost sensitive, and removing contaminants from different types of post-consumer plastics is a major cost of processing them. Accordingly, high-speed, automated sorting systems are needed to sort foreign materials, including different types of plastics, from post-consumer plastic articles.

Many post-consumer plastic articles are containers, such as beverage containers, that are formed from a single plastic, such as polyvinyl chloride (PVC) or polyethylene terephthalate (PET). The wide availability of PVC and PET as post-consumer materials make them relatively desirable for recycling.

Articles made of PVC and PET have many common characteristics, such as density, optical transmissivity, and color and are therefore difficult to sort automatically. However, these two plastics are chemically distinct, and PVC in particular is considered to be a contaminant of PET when intermixed during recycling. Such contaminants are difficult to remove during the recycling process and, therefore, greatly diminish the value of the recycled PET plastic.

Some post-consumer plastics sorting systems, such as ones described in U.S. Pat. No. 5,141,110, issued Aug. 25, 1992, for METHOD OF SORTING PLASTIC ARTICLES, employ polarized light to detect crystallinity differences between PET and PVC when sorting whole post-consumer containers. Such sorting is possible because PET has a significant amount of crystallinity induced birefringence and PVC does not. Therefore, placing a PET article between a pair of crossed polarizers will cause the polarizers to pass light, whereas placing a PVC article between the crossed polarizers will not. Unfortunately, sorting whole post-consumer containers suffers from relatively low throughput and is incapable of removing from the recycled articles attached foreign objects, such as labels and caps that remain attached by consumers. Therefore, post-consumer plastic articles are typically shredded into flakes before processing. However, flakes are difficult to sort with polarized light because of their small sizes and randomized orientations, with PET flakes being particularly difficult to reliably detect and sort.

Therefore, prior workers have developed another technique for sorting PET from PVC flakes that is described in U.S. Pat. No. 5,419,438, issued May 30, 1995, for APPARATUS AND METHOD FOR SORTING POST-CONSUMER ARTICLES ACCORDING TO PVC CONTENT, which is assigned to the assignee of this application. This technique employs ultraviolet illumination of the articles, which causes only the PVC flakes to undergo phosphorescence rendering them detectable. The phosphorescence has a low light intensity requiring the sorting system to employ light shields, low ambient lighting, and image intensifiers to achieve an acceptable sorting throughput. Further throughput improvements are possible by washing and preilluminating the flakes. However, such measures are unduly costly and complex.

What is needed, therefore, is a PET and PVC flake sorting technique that is reliable, has high sorting throughput, and is not unduly costly and complex.

SUMMARY OF THE INVENTION

An object of this invention is, therefore, to provide an apparatus and a method for sorting post-consumer plastic articles.

Another object of this invention is to provide such an apparatus and a method for sorting post-consumer flaked PET articles from post-consumer flaked PVC articles.

A further object of this invention is to provide such an apparatus and a method for sorting articles at a high throughput and without undue cost or complexity.

In a preferred embodiment, a sorting apparatus of this invention includes an infeed conveyor belt for propelling a broad stream of randomly arranged PET and PVC articles through an inspection zone positioned just beyond an end of the belt and having a width that extends transversely just beyond the edges of the belt. The inspection zone also has a length longitudinally spanning a first light polarizer/analyzer combination, an article-detecting gap, and a second light polarizer/analyzer combination that are closely spaced apart such that articles are propelled through the inspection zone in a substantially constant orientation. Multiple articles separated along the width of the inspection zone may be propelled simultaneously through the length of the inspection zone.

The first and second polarizer/analyzer combinations are each oriented to extinguish light and are oriented 45 degrees relative to each other such that at least one polarizer/analyzer combination is favorably aligned with a principal axis of birefringence of PET articles propelled therebetween. The article-detecting gap between the first and second polarizer/analyzer combinations is employed to detect the presence of articles in the inspection zone.

A tri-linear charge-coupled device ("CCD") array camera is positioned and oriented such that its first, second, and third CCD arrays receive light from, respectively, the first light polarizer/analyzer combination, the article-detecting gap, and the second light polarizer/analyzer combination. When the second CCD array detects the presence of an article in the inspection zone, data received from the first and third CCD arrays are sampled to determine whether either of them detects light indicative that the article is made from, for example, PET.

The first, second, and third CCD arrays generate respective first, second, and third video signals representative of the light each receives. In coordination with the article-propelling speed of the infeed conveyor belt, a processor processes the second video signal to identify the presence of multiple articles along the width of the inspection zone and processes the first and third video signals to determine whether each of the multiple articles is made from, for example, PET. In further coordination with the article-propelling speed of the infeed conveyor belt, the processor selectively activates multiple air ejectors to separate the PET articles from the other articles. Accordingly, the sorting system of this invention is capable of relatively simply and inexpensively providing high throughput and reliable sorting of post-consumer flaked PET articles from post-consumer flaked PVC articles.

Additional objects and advantages of this invention will be apparent from the following detailed description of a preferred embodiment thereof that proceeds with reference to the accompanying drawings.

DETAILED DESCRIPTION OF A PREFERRED EMBODIMENT

It was discovered that PET flakes cut from extruded containers, such as beverage bottles, have a principal axis of birefringence that prevents or substantially reduces the rotation of polarized light by flakes placed in certain orientations between crossed polarizers. This explains one difficulty of reliably detecting PET flakes with polarized light. However, because plastic flakes are irregularly shaped and typically only 3 millimeters (0.125 inch) to 10 millimeters (0.375 inch) in major diameter, they are difficult to align in a favorable orientation. This invention circumvents such problems associated with reliably detecting and sorting PET flakes from other plastic articles.

Figure 1:
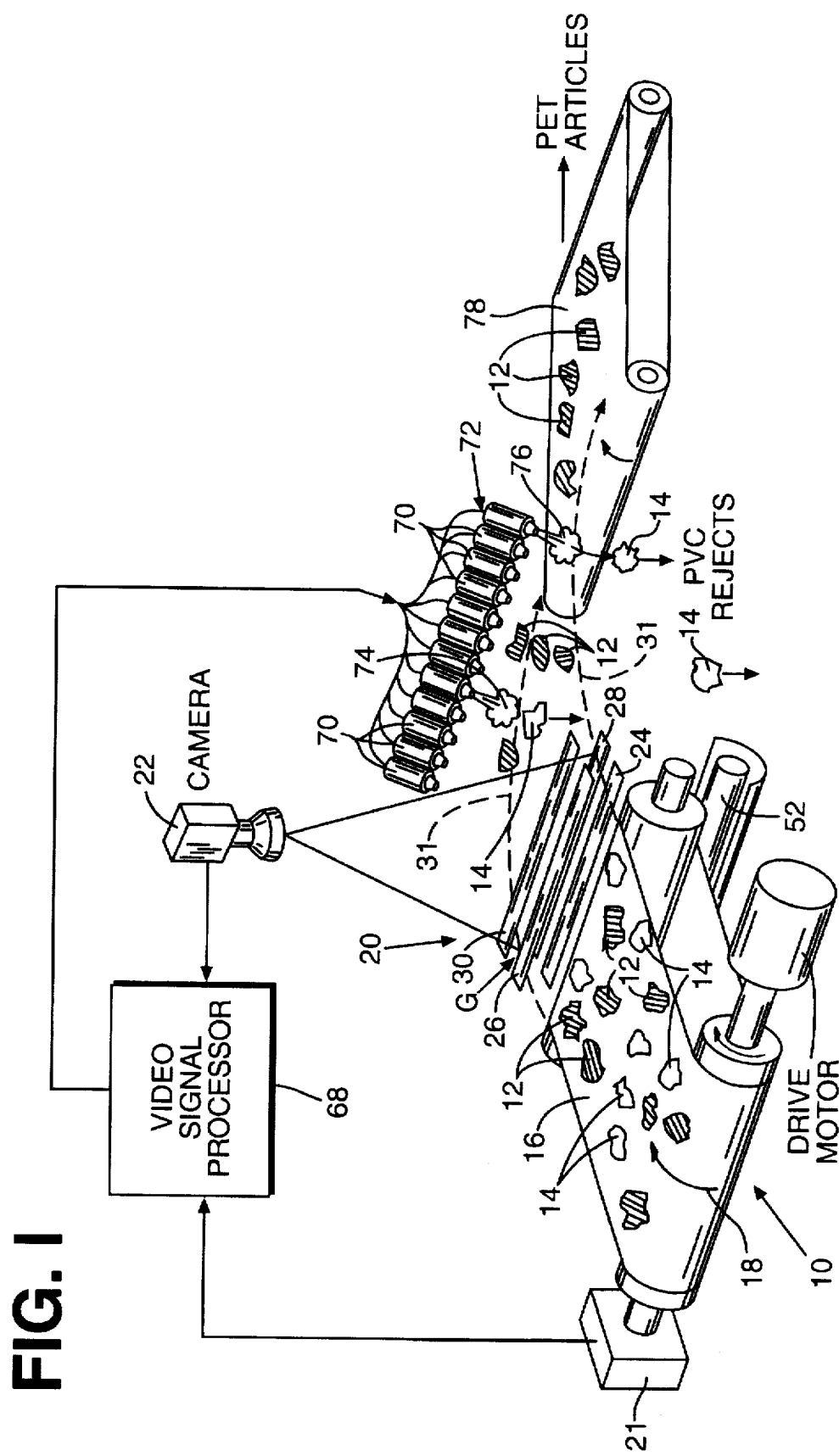
FIG. 1 is an isometric pictorial view of a plastic article sorting system showing an inspection zone, a light source, and a scanning camera of this invention.
Figure 2:
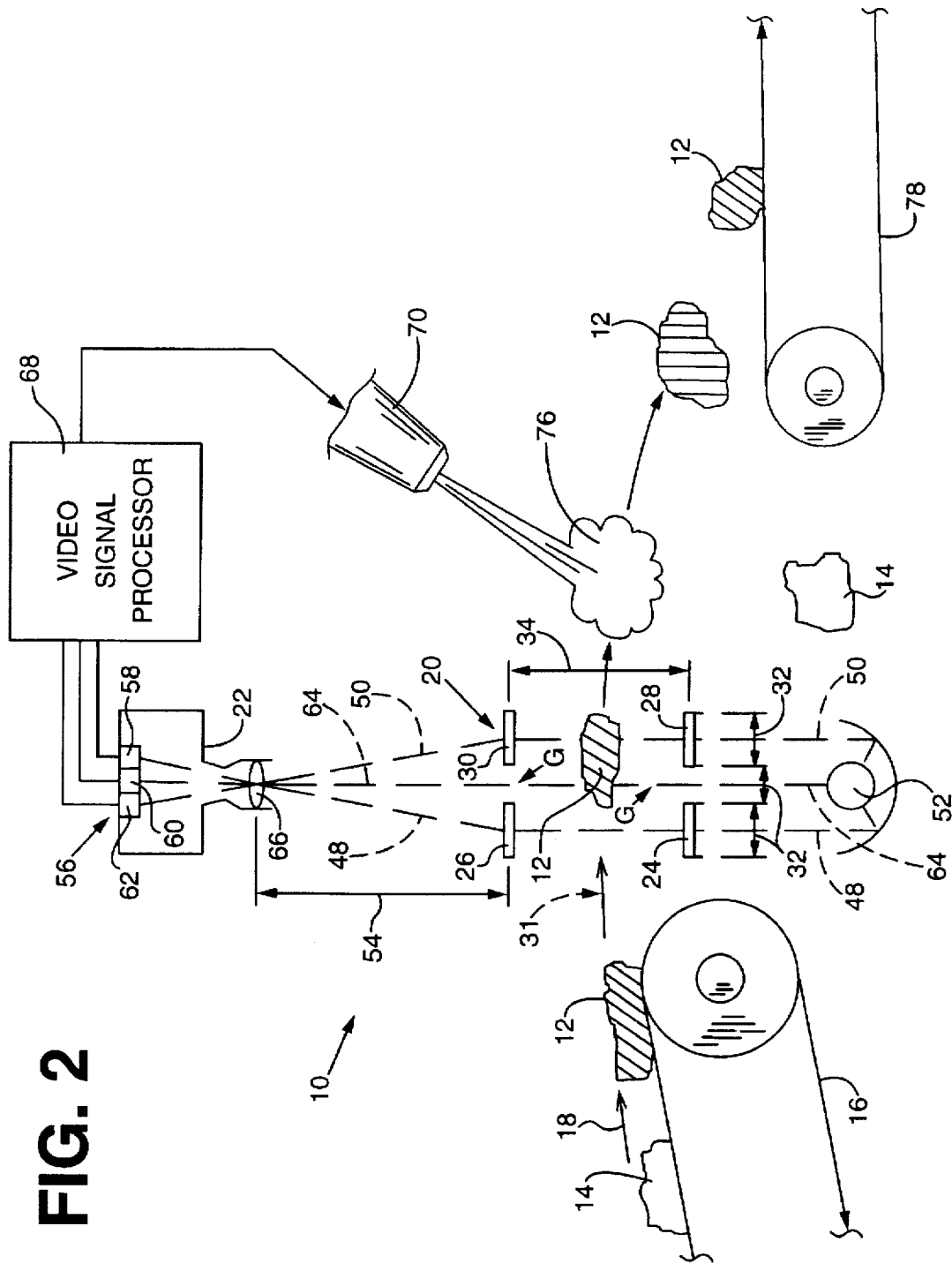
FIG. 2 is an enlarged schematic side elevation view showing additional details of the inspection zone, the light source, and the scanning camera of FIG. 1, and further showing plastic articles traveling through a closely spaced-apart pair of light polarizer/analyzer combinations of this invention.

Referring to FIGS. 1 and 2, a sorting system 10 of this invention sorts PET articles 12 from other plastic articles, such as PVC articles 14, that are randomly scattered on an infeed conveyor belt 16 that propels the articles in a direction 18 through an aerial inspection zone 20. A rotary encoder 21 coupled to infeed conveyor belt 16 provides timing pulses proportional to a velocity at which the articles are propelled through inspection zone 20. Infeed conveyor belt 16 propels multiple articles 12 and 14 at a time through inspection zone 20, which is defined by a field of view of a light detector, such as a video camera 22 preferably employing a tri-linear CCD array, model KLI 2103 manufactured by Kodak located in Rochester, N.Y.

In the preferred embodiment, PET articles 12 and PVC articles 14 are pieces or "flakes" of post-consumer plastic products, such as food and beverage containers. The PVC articles 14 are sorted out because they are considered an undesirable contaminant of PET articles 12. It will be appreciated, however, that sorting system 10 can be operated according to other sorting objectives.

Inspection zone 20 has a 122 centimeter (48 inch) width that extends transversely just beyond the downstream end of infeed conveyor belt 16. Inspection zone 20 also has a 14.3 millimeter (0.56 inch) length that spans a first light polarizer 24 combined with a first light analyzer 26, an article-detecting gap G, and a second light polarizer 28 combined with second light analyzer 30. Light polarizers 24 and 28 and light analyzers 26 and 30 are positioned on either side of an article trajectory plane 31 (shown in dashed lines) and are compactly sized and spaced closely apart in the direction 18. Because of the compact size and close spacing of light polarizers 24 and 28 and light analyzers 26 and 30, larger ones of articles 12 and 14 occupy a substantial length of inspection zone 20 when articles 12 and 14 are centered in inspection zone 20 during their travel along article trajectory plane 31. Furthermore, smaller ones of articles 12 and 14 move rapidly through the length of inspection zone 20 and, therefore, maintain a relatively constant orientation as they travel through inspection zone 20.

Gap G, light polarizers 24 and 28, and light analyzers 26 and 30 each have about a 4.8 millimeter (0.1875 inch) length (indicated by dimension lines 32) and about a 122 centimeter (48 inch) width. Polarizers 24 and 28 and the respective analyzers 26 and 30 are spaced apart vertically by about a 2.54 centimeter (1 inch) distance indicated by dimension lines 34.

As shown in FIG. 1, multiple articles may be separated along the width of infeed conveyor belt 16 for substantially simultaneous propulsion through inspection zone 20.

Figure 3:
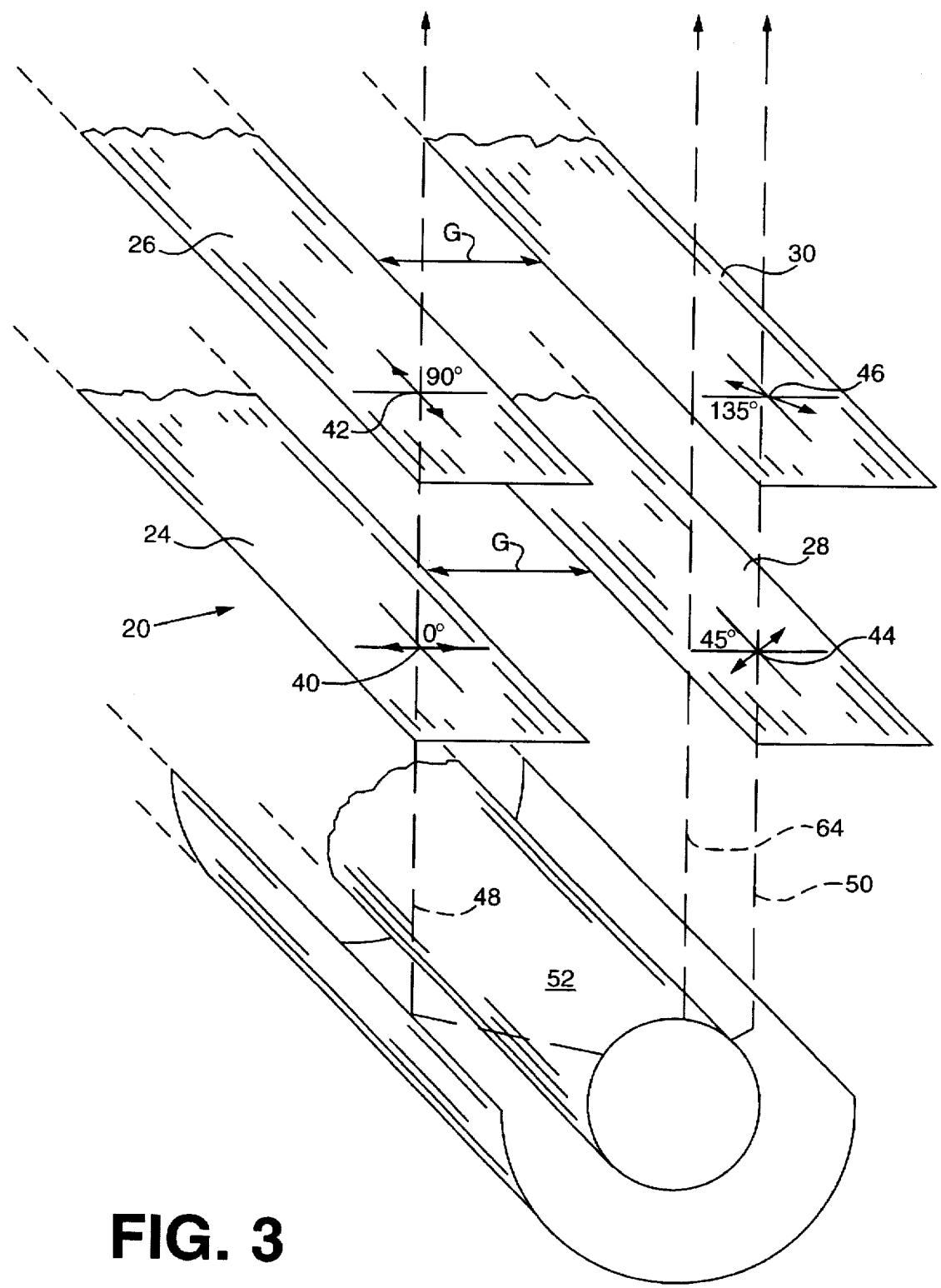
FIG. 3 is an enlarged fragmentary isometric view of the light source and pair of polarizer/analyzer combinations of FIG. 2 showing preferred orientations of their polarization axes.

FIG. 3 shows in enlarged detail the preferred arrangement of gap G, light polarizers 24 and 28, and light analyzers 26 and 30. Detecting PET articles 12, despite their principal axes of birefringence, entails orienting a light transmitting polarization axis 40 of polarizer 24 at a 90 degree angle relative to a light transmitting polarization axis 42 of analyzer 26 and orienting a light transmitting polarization axis 44 of polarizer 28 at a 90 degree angle relative to a light transmitting polarization axis 46 of analyzer 30. With this arrangement and in the absence of polarization direction sensitive articles in inspection zone 20, the analyzer of each polarizer/analyzer combination extinguishes normally incident light rays 48 and 50 propagating from a randomly polarized light source 52. It will be appreciated that light rays 48 and 50 are shown as exemplary members of larger sets of light rays emanating from light source 52.

Polarizers 24 and 28 and analyzers 26 and 30 have substantially parallel planar surfaces that span the full width of inspection zone 20. Moreover, polarization axes 40 and 42 are offset 45 degrees relative to axes of polarization 44 and 46 such that at least one polarizer/analyzer combination will be favorably aligned with the principal axis of birefringence of PET articles 12 propelled through inspection zone 20. In FIG. 3, the polarizer/analyzer combinations are offset relative to each other such that transmission axes 40, 42, 44, and 46 are oriented at 0, 90, 45, and 135 degrees, respectively, relative to transmission axis In the preferred embodiment, the optimum favorable alignment constitutes the positioning of an article 12 so that its principal axis of birefringence is set at 45 degrees relative to the respective transmission axes 40 and 42 of polarizer 24 and analyzer 26 or at 45 degrees relative to the respective transmission axes 44 and 46 of polarizer 28 and analyzer 30. The optical component arrangement described above is such that the transmission axes of the polarizer and analyzer not aligned at 45 degrees relative to the principal axis of birefringence are either parallel or perpendicular to it. This alignment permits a maximum amount of light intensity to exit the transmission axis of the analyzer to which the principal axis of birefringence is set at 45 degrees and a minimum amount of light intensity to exit the transmission axis of the other analyzer.

As the principal axis of birefringence of article 12 is angularly offset from the orientation specified above, light of lesser intensity exits the analyzer originally transmitting maximum light intensity and light of greater intensity exits the analyzer originally transmitting minimum light intensity. The transmission axes of either analyzer cycles through maximum and minimum light intensity transmission with each successive 45 degree interval of angular displacement of the principal axis of birefringence.

Whenever a birefringent article 12 such as a PET flake is positioned between either of the polarizer/analyzer combinations, depending on the angular orientation of the principal axis of birefringence of the PET flake, light propagating through article 12 undergoes an electric field vector phase shift that changes the polarization direction of the light transmitted through the polarizer and causes the light to exit the analyzer by an amount corresponding to the angular orientation of the principal axis. A nonbirefringent article 14 such as a PVC flake will not appreciably affect the polarization direction of the light transmitted through the polarizer and, therefore, will not cause the light to exit either analyzer.

Referring again to FIG. 2, video camera 22 is positioned a distance 54, preferably about 122 centimeters (48 inches) above inspection zone 20, and oriented such that a tri-linear CCD array 56 having first, second, and third CCD arrays 58, 60, and 62, respectively, receive light rays 48 propagating from analyzer 26, light rays 64 propagating through article-detecting gap G, and light rays 50 propagating from analyzer 30. Light rays 48, 50, and 64 converge at a nodal point in a lens 66 and diverge such that analyzer 26, gap G, and analyzer 30 are imaged respectively on CCD arrays 58, 60, and 62. Each of CCD arrays 58, 60, and 62 is preferably a linear array of 2,048 CCD elements that resolve the 122 centimeter (48 inch) widths of analyzer 26, gap G, and analyzer 30 into 2,048 separate 0.6 by 0.6 millimeter image elements referred to as pixels. CCD arrays 58, 60, and 62 are preferably spaced apart by 8 pixel widths, or 4.76 millimeters.

First, second, and third CCD arrays 58, 60, and 62 generate respective first, second, and third video signals representative of the intensities of the light each CCD array receives from inspection zone 20. Each video signal is a repetitive stream of 2,048 video data elements in which each has a data value proportional to the intensity of light received by its associated pixel.

A video signal processor 68 employs the timing pulses from rotary encoder 21 to store multiple "scan lines" of the first, second, and third video signals in a memory (not shown) in synchronism with the speed of infeed conveyor belt 16. Each scan line represents a scan line image generated by light rays 48, 64, and 50 as they propagate through inspection zone 20. Each scan line of the first, second, and third video signals is stored simultaneously with successive scan lines stored in a time delayed relationship defined by the timing pulses received from rotary encoder 21. Preferably about 32 scan lines are stored in the memory such that the most recently received set causes the oldest set to be deleted. Thereby, the memory always contains the most recent 32 scan line images of inspection zone 20.

However, the first, second, and third video signals comprising each scan line represent images that are spaced apart along the length of inspection zone 20 and do not, therefore, represent an aligned image of the same portion of an article as it passes through inspection zone 20.

To realign the image of the article, a temporal realignment is accomplished by video signal processor 68 when the memory is read out. The temporal realignment preferably entails reading and overlaying from the memory the most recently stored scan line of the first video signal, the fifth most recently stored scan line of the second video signal, and the ninth most recently stored scan line of the third video signal. The four scan line delays thus imposed between each of the video signals compensate for the physical separation of light rays 48, 64, and 50 as the article moves through inspection zone 20. In this manner, a temporally realigned image of the article is processed by video signal processor 68.

Skilled workers will recognize that other sets of delays are possible to perform the temporal realignment, and that those delays depend on, for example, the scanning rate, spacing of the light rays, speed of article movement, and rate of the timing pulses from rotary encoder 21.

Video signal processor 68 then logically processes the temporally overlayed video data elements to detect the presence and location of each article in gap G by examining the data values of the second video signal data elements. Those video signal elements having relatively reduced data values are indicative of articles attenuating light rays 64 propagating from and reaching CCD array 60. The particular video signal elements having relatively reduced data values have corresponding pixels in the array that receive reduced light intensity from corresponding locations of the articles along the 122 centimeter (48 inch) width of gap G.

When any of the second video signal element values indicate the presence and location of an article or articles in gap G, the corresponding temporally overlayed first and third video signal element values are examined by video signal processor 68 to determine whether either of them has an increased data value above a predetermined threshold that indicates the associated article or articles are made from PET. Accordingly, a detected article or articles not having corresponding video signal elements with increased data values are determined to have been made from other than PET and should be sorted out or ejected.

In coordination with the timing pulses received from rotary encoder 21, and the detection and location of PET articles 12 and PVC (or other material) articles 14 in inspection zone 20, video signal processor 68 selectively activates particular air ejectors 70 in an air ejector array 72 (only one air ejector 70 shown in FIG. 2) to deliver air blasts, such as air blasts 74 and 76 to separate articles 14 from PET articles 12. PET articles 12 are thereby propelled through inspection zone 20, and by cooperation among video camera 22, tri-linear CCD array 56, and video signal processor 68, are detected, located, and identified to have been made of PET and are allowed to pass freely for collection on an exit conveyor belt 78. In contrast, other articles, such as PVC articles 14, are propelled through inspection zone 20, and by cooperation among video camera 22, tri-linear CCD array 56, and video signal processor 68, are detected, located, and identified to have not been made of PET and are, therefore, ejected by an air blast, such as air blast 76.

Sorting system 10 of this invention is capable of providing high throughput, reliable sorting of post-consumer flaked PET articles from post-consumer flaked PVC articles, without requiring unduly complex and costly light shields, low ambient lighting, image intensifiers, and washing or preillumination of the plastic articles.

Skilled workers will recognize that portions of this invention may be implemented differently from the implementations described above for a preferred embodiment. For example, the invention will work with any sufficiently transparent article made of a polarization direction sensitive material and may be further adapted to work with a wide variety of sizes and shapes of flaked and unflaked articles by appropriately changing the above-described dimensions, spacings, light source, light detectors, processor, infeed method, ejecting method, and exit method. Likewise, the polarization axes of each light polarizer/analyzer combination need not be set to extinguish light incident to it, and the angular offset between polarization axes of the first and second light polarizer/analyzer combinations may vary substantially from 45 degrees. Additional polarizer/analyzer combinations each having a different angular offset may be added to the inspection zone. In an embodiment in which each polarizer/analyzer combination is set to transmit, for example, one-half light intensity, no article detecting gap is required, and the signal processor may be set to detect positive and negative light intensity changes. Of course, in embodiments requiring an article detecting gap, it need not be located centrally in the inspection zone.

The invention may be adapted to eject PET, or other articles, rather than PVC, may be configured as a gravity feed sorter, and may operate on a singulated stream of articles. Of course, discrete light detectors may be employed in place of the CCD arrays, a collection bin may replace the exit conveyor belt, and ejectors other than air ejectors may be employed.

It will be obvious to those having skill in the art that many changes may be made to the details of the above-described embodiment of this invention without departing from the underlying principles thereof. Accordingly, it will be appreciated that this invention is also applicable to plastic detecting applications other than those found in post-consumer plastic article sorters. The scope of this invention should, therefore, be determined only by the following claims.

We claim:

1. An apparatus for detecting an article having a principal axis of birefringence, comprising:
   a light source positioned to emit first and second light rays that propagate through respective first and second portions of an inspection zone having a length;
   a first light polarizer spaced apart from a first light analyzer to form between them the first portion of the inspection zone, the first light ray striking the first light polarizer and exiting the first light analyzer, the first light polarizer having a first polarization axis and the first light analyzer having a first analyzer axis, the first polarization and analyzer axes oriented to cause the first light ray to exit the first light analyzer at a predetermined intensity;
   a second light polarizer spaced apart from a second light analyzer to form between them the second portion of the inspection zone, the second light ray striking the second light polarizer and exiting the second light analyzer, the second light polarizer having a second polarization axis and the second light analyzer having a second analyzer axis, the second polarization and analyzer axes oriented to cause the second light ray to exit the second light analyzer at a second predetermined intensity, the second polarization axis being angularly offset relative to the first polarization axis;
   a conveyor causing the article to move at a predetermined speed and in a substantially constant arbitrary orientation along the length of the inspection zone such that the principal axis of birefringence of the article has an orientation that causes a change in intensity of at least one of the first light ray intersecting the article and exiting the first light analyzer and the second light ray intersecting the article and exiting the second light analyzer; and first and second light detectors positioned to detect, respectively, changes in intensity of the first and second light rays from their respective first and second predetermined intensities, a change in intensity of at least one of the first and second light rays indicating that the article has a principal axis of birefringence.

2. The apparatus of claim 1 in which the first polarization and analyzer axes and the second polarization and analyzer axes are oriented so that the respective first predetermined intensity and the second predetermined intensity are of minimum intensity, and in which the change in intensity is an increase in intensity.

3. The apparatus of claim 1 in which the light source emits a third light ray that propagates through a third portion of the inspection zone, the third portion being located adjacent to at least one of the first and second portions of the inspection zone and the third light ray having an intensity, and in which a third light detector is positioned to detect the intensity of the third light ray.

4. The apparatus of claim 3 in which a reduction in intensity of the third light ray detected by the third light detector indicates that the article is present in the third portion of the inspection zone.

5. The apparatus of claim 1 in which the change in intensity of at least one of the first light ray exiting the first light analyzer and the second light ray exiting the second light analyzer is of an amount that indicates the article is formed from polyethylene terephthalate.

6. The apparatus of claim 5 in which the article is a flake of polyethylene terephthalate, and the first and second portions of the inspection zone are closely spaced along its length such that the flake of polyethylene terephthalate extends sufficiently into the first and second portions of the inspection zone to permit substantially simultaneous detection of changes in intensities of the first and second light rays by the first and second light detectors.

7. The apparatus of claim 5 in which the article is a flake of polyethylene terephthalate and in which the first and second portions of the inspection zone are closely spaced along its length, the apparatus further comprising a processor that sequentially times the operation of the first and second light detectors so that as the flake of polyethylene terephthalate moves at the predetermined speed along the length of the inspection zone, the first and second light detectors are timed to sequentially detect the first and second light rays as they propagate through the flake of polyethylene terephthalate.

8. The apparatus of claim 1 in which the second polarization axis is angularly offset relative to the first polarization axis by about 45 degrees.

9. The apparatus of claim 1 in which the conveyer comprises an infeed conveyor belt that propels the article along a trajectory that extends along the length of the inspection zone.

10. The apparatus of claim 1 in which the article is one of multiple articles that have principal axes of birefringence, the conveyor has a width, and the inspection zone has a width positioned in alignment with the width of the conveyor to receive the multiple articles moved by the conveyor.

11. The apparatus of claim 10 in which the width of the inspection zone defines widths of its first and second portions, and in which first and second light rays are members of respective first and second sets of light rays emitted by the light source, propagate transversely of the widths of the first and second portions of the inspection zone, intersect the multiple articles, and strike the first and second light detectors.

12. The apparatus of claim 11 in which particular members of the first and second sets of light rays that exit the respective first and second light analyzers have changes in intensity that indicate the particular articles causing the changes in intensity each have a principal axis of birefringence.

13. The apparatus of claim 12 in which the particular articles are flakes of polyethylene terephthalate, and the first and second portions of the inspection zone are closely spaced along its length such that the flakes of polyethylene terephthalate extend sufficiently into the first and second portions of the inspection zone to effect substantially simultaneous detection by the first and second light detectors of changes in intensities of the particular members of the first and second sets of light rays.

14. The apparatus of claim 12 in which the particular articles are flakes of polyethylene terephthalate and in which the first and second portions of the inspection zone are closely spaced along its length, the apparatus further comprising a processor that receives first and second video signals from the first and second light detectors representative of unaligned images of the flakes of polyethylene terephthalate as they move at the predetermined speed along the length of the inspection zone, the processor delaying the processing of the second video signal relative to the first video signal to temporally realign the images of the flakes of polyethylene terephthalate.

15. The apparatus of claim 12 in which the first and second light detectors further include respective first and second light detector arrays.

16. The apparatus of claim 15 in which the light source emits a third set of light rays that propagate through a third portion of the inspection zone, the third portion having a width and being located adjacent to at least one of the first and second portions of the inspection zone, and the third set of light rays having intensities, and in which a third light detector including a third light detector array is positioned to detect the intensities of the third set of light rays.

17. The apparatus of claim 16 further comprising a video camera that includes a tri-linear charge-coupled device array in which the first, second, and third light detector arrays are an integral part, the video camera employing a lens to image the first, second, and third sets of light rays on, respectively, the first, second, and third light detector arrays.

18. The apparatus of claim 16 in which the third light detector array detects reduced intensities associated with particular members of the third set of light rays, each of the reduced intensities indicating that an associated one of the multiple articles is present in the third portion of the inspection zone.

19. The apparatus of claim 18 further including a signal processor, and in which the first, second, and third light detector arrays generate respective first, second, and third video signals, the signal processor processing the third video signal to detect signal elements having reduced data values indicating a presence and a location of each of the multiple articles along the width of the inspection zone.

20. The apparatus of claim 19 in which for each reduced value signal element of the third video signal, the signal processor evaluates data values of associated signal elements of the first and second video signals, a change in a datum value of at least one of the first and second signal elements indicating the presence and location along the width of the inspection zone of articles having the principal axis of birefringence.

21. The apparatus of claim 20 further comprising an article ejector mechanism actuatable by the signal processor to sort from among the multiple articles those articles having principal axes of birefringence.

22. The apparatus of claim 21 in which the article ejection mechanism comprises an air ejector.

23. A method for detecting an article having a principal axis of birefringence, comprising:

propagating light rays through an inspection zone;

spacing apart a first light polarizer and a first light analyzer to form a first portion of the inspection zone therebetween, the first light polarizer having a first polarization axis and the first light analyzer having a first analyzer axis, the first polarization and analyzer axes oriented to transmit an intensity of a first light ray entering the first light polarizer, propagating through the first portion of the inspection zone, and exiting the first light analyzer;

spacing apart a second light polarizer and a second light analyzer to form a second portion of the inspection zone therebetween, the second light polarizer having a second polarization axis and the second light analyzer having a second analyzer axis, the second polarization and analyzer axes oriented to transmit an intensity of a second light ray entering the second light polarizer, propagating through the second portion of the inspection zone, and exiting the second light analyzer;

offsetting angularly the second polarization axis relative to the first polarization axis;

conveying the article at a predetermined velocity and in a substantially constant arbitrary orientation along a length of the inspection zone such that the principal axis of birefringence of the article has an orientation that causes a changed intensity of at least one of the first light ray intersecting the article and exiting the first light analyzer and the second light ray intersecting the article and exiting the second light analyzer; and detecting the changed intensity of at least one of the first light ray exiting the first light analyzer and the second light ray exiting the second light analyzer.

24. The method of claim 23 in which the first analyzer axis and the second analyzer axis are each oriented relative to their respective polarization axes to transmit a minimum intensity of the respective first and second light rays, and in which the changed intensity is an increased intensity.

25. The method of claim 23 further including detecting an intensity of a third light ray propagating through a third portion of the inspection zone that is located adjacent to at least one of the first and second portions of the inspection zone.

26. The method of claim 25 in which a reduced intensity of the third light ray detected by the third light detector is indicative that the article is present in the third portion of the inspection zone.

27. The method of claim 23 in which the changed intensity of at least one of the first light ray exiting the first light analyzer and the second light ray exiting the second light analyzer is indicative that the article is formed from polyethylene terephthalate.

28. The method of claim 27 further including spacing the first and second portions of the inspection zone closely along the length of the inspection zone and detecting substantially simultaneously the changed intensities of the first and second light rays.

29. The method of claim 27 further including spacing the first and second portions of the inspection zone closely along the length of the inspection zone such that the article moves at the predetermined velocity along the length of the inspection zone and detecting and sequentially processing the first and second light rays as they propagate through the flake of polyethylene terephthalate.

30. The method of claim 23 in which the offsetting step entails offsetting angularly the second polarization axis relative to the first polarization axis by an angle of about 45 degrees.

31. The method of claim 23 in which the conveying step includes propelling the article along a trajectory that extends along the length of the inspection zone.

32. The method of claim 23 in which the article is one of multiple articles, particular ones of which have a principal axis of birefringence, and the inspection zone further has a width positioned to receive the multiple articles during the conveying step.

33. The method of claim 32 in which the first and second light rays are members of respective first and second sets of light rays that propagate through the width of the first and second portions of the inspection zone, intersect the multiple articles, and are detected.

34. The method of claim 33 in which particular members of the sets of light rays that exit the first and second light analyzers have a changed intensity that is indicative that the particular articles causing the changed intensity each have the principal axis of birefringence.

35. The method of claim 34 in which the particular articles are flakes of polyethylene terephthalate and the method further includes spacing closely along the length of the inspection zone the first and second portions of the inspection zone and detecting substantially simultaneously the changed intensities of the members of the first and second sets of light rays.

36. The method of claim 34 in which the particular articles are flakes of polyethylene terephthalate and the method further includes spacing closely along the length of the inspection zone the first and second portions of the inspection zone, conveying the flakes of polyethylene terephthalate at the predetermined velocity along the length of the inspection zone, and detecting and temporally realigning the first and second sets of light rays as they propagate through the flakes of polyethylene terephthalate.

37. The method of claim 34 in which the detecting step includes positioning first and second light detector arrays to detect the intensities of the associated first and second sets of light rays exiting the first and second light analyzers.

38. The method of claim 37 further including positioning a third light detector array to receive a third set of light rays propagating through the width of a third portion of the inspection zone that is located adjacent to at least one of the first and second portions of the inspection zone.

39. The method of claim 38 in which the third light detector array detects reduced intensities associated with particular members of the third set of light rays, each of the reduced intensities indicative that an associated one of the multiple articles is present in the third portion of the inspection zone.

40. The method of claim 39 in which the first, second, and third light detector arrays respectively generate first, second, and third video signals, and the method further includes processing the third video signal to detect signal elements having reduced data values indicative of a presence and a location of each of the multiple articles along the width of the inspection zone.

41. The method of claim 41 further including associating reduced value signal elements of the third video signal with corresponding signal elements of the first and second video signals and identifying any of the associated signal elements that have changed data values to indicate the presence and location along the width of the inspection zone of articles having the principal axis of birefringence.

42. The method of claim 41 in which the identifying step further includes sorting the articles having the principal axis of birefringence from among the multiple articles.

43. The method of claim 38 in which the first, second, and third light detector arrays are integral to a tri-linear charge-coupled device array in a video camera, and the method further includes imaging the first, second, and third sets of light rays respectively on the first, second, and third light detector arrays.

\* \* \* \* \*